(12) United States Patent
Maniwa

(10) Patent No.: US 9,828,017 B2
(45) Date of Patent: Nov. 28, 2017

(54) CAM DEVICE, POSITION-ADJUSTING DEVICE FOR STEERING WHEEL, AND METHOD FOR ASSEMBLING POSITION-ADJUSTING DEVICE FOR STEERING WHEEL

(71) Applicant: NSK LTD., Tokyo (JP)

(72) Inventor: Takahiro Maniwa, Maebashi (JP)

(73) Assignee: NSK Ltd. (JP)

( * ) Notice: Subject to any disclaimer, the term of this patent is extended or adjusted under 35 U.S.C. 154(b) by 0 days.

(21) Appl. No.: 15/127,883

(22) PCT Filed: Nov. 13, 2015

(86) PCT No.: PCT/JP2015/082038
§ 371 (c)(1),
(2) Date: Sep. 21, 2016

(87) PCT Pub. No.: WO2016/076430
PCT Pub. Date: May 19, 2016

(65) Prior Publication Data
US 2017/0240198 A1 Aug. 24, 2017

(30) Foreign Application Priority Data
Nov. 14, 2014 (JP) ................. 2014-231241

(51) Int. Cl.
*B62D 1/184* (2006.01)
*B23P 15/00* (2006.01)
*B62D 1/187* (2006.01)

(52) U.S. Cl.
CPC .............. *B62D 1/184* (2013.01); *B23P 15/00* (2013.01); *B62D 1/187* (2013.01); *B23P 2700/50* (2013.01)

(58) Field of Classification Search
CPC .................. B62D 1/184; B62D 1/187
See application file for complete search history.

(56) References Cited

U.S. PATENT DOCUMENTS 6,182,808 B1 * 2/2001 Walton ................. B60K 17/351
  192/35
7,562,548 B1 * 7/2009 Cymbal ............ B60R 25/02107
  70/186

(Continued)

FOREIGN PATENT DOCUMENTS

EP  1795425 A2 * 6/2007 ............. B62D 1/184
JP  2000-053001  2/2000
(Continued)

*Primary Examiner* — James A English
(74) *Attorney, Agent, or Firm* — Hartman Global IP Law; Gary M. Hartman; Domenica N. S. Hartman

(57) ABSTRACT

Construction is achieved that makes it possible to easily determine whether or not a combination of a drive-side cam and driven-side cam is suitable. Driven-side concave grooves 47 that are depressed inward in the radial direction and extend along the axial direction are formed in the outer-circumferential surface of the driven-side cam 30a at two locations on opposite sides in the radial direction. First drive-side concave grooves 45 that are depressed inward in the radial direction and extend along the axial direction are formed in portions of the outer-circumferential surface of the drive-side cam 29a such that the phase thereof in the circumferential direction in the locked state coincides with that of the driven-side concave grooves 47, and second drive-side concave grooves 46 that are depressed inward in the radial direction and extend along the axial direction are formed in portions of the outer-circumferential surface of the drive-side cam 29a such that the phase thereof in the circumferential direction in the unlocked state coincides with that of the driven-side concave grooves 47.

6 Claims, 10 Drawing Sheets

(56) References Cited

U.S. PATENT DOCUMENTS

| | | | | |
|---|---|---|---|---|
| 7,717,011 B2* | 5/2010 | Hirooka | ................. | B62D 1/184 280/777 |
| 2002/0023515 A1* | 2/2002 | Kuroumaru | ............ | B62D 1/184 74/493 |
| 2005/0178231 A1* | 8/2005 | Schick | ................... | B62D 1/184 74/493 |
| 2012/0312117 A1* | 12/2012 | Maniwa | ................. | B62D 1/184 74/493 |
| 2015/0068353 A1* | 3/2015 | Mihara | ................. | B62D 1/184 74/493 |
| 2016/0297463 A1* | 10/2016 | Tomaru | ................. | B62D 1/184 |
| 2017/0066468 A1* | 3/2017 | Tomiyama | ............ | B62D 1/184 |

FOREIGN PATENT DOCUMENTS

| | | |
|---|---|---|
| JP | 2000-108639 | 4/2000 |
| JP | 2009-227181 | 10/2009 |
| JP | 2014104870 | 6/2014 |

\* cited by examiner

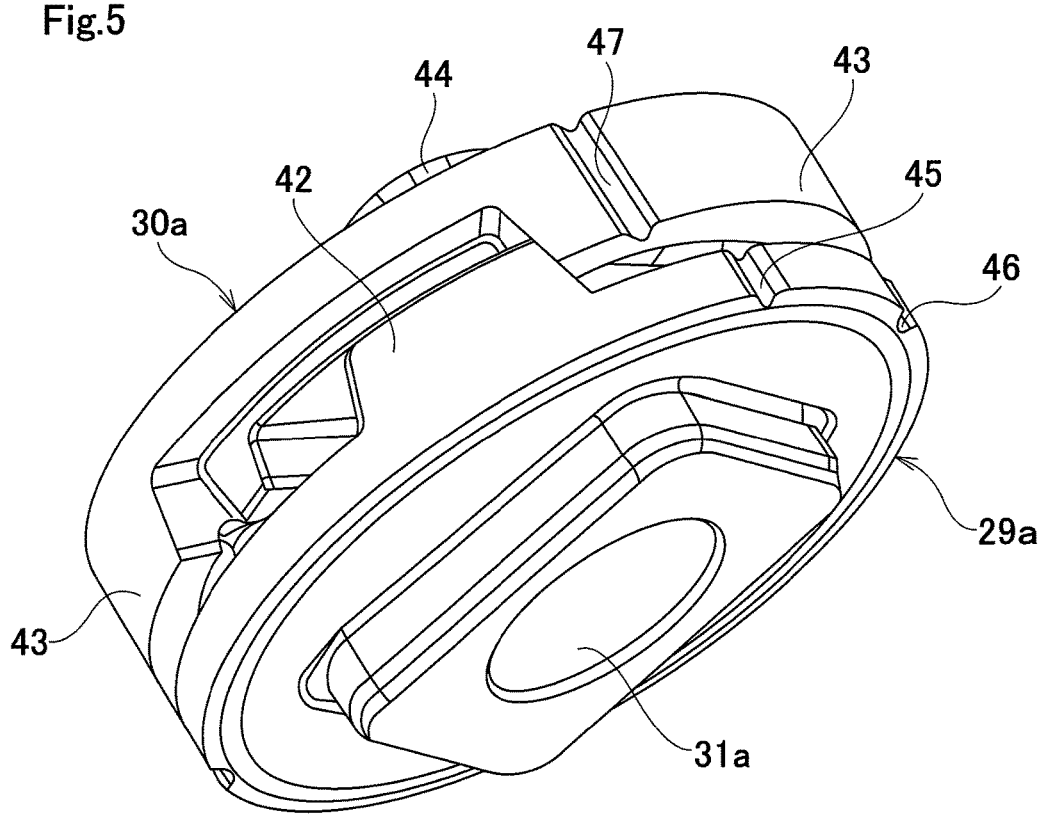

Unlocking Direction

CAM DEVICE, POSITION-ADJUSTING DEVICE FOR STEERING WHEEL, AND METHOD FOR ASSEMBLING POSITION-ADJUSTING DEVICE FOR STEERING WHEEL

TECHNICAL FIELD

The present invention relates to a cam device that is assembled and used in a position-adjusting device for a steering wheel for making it possible to adjust the height position of a steering wheel for example.

BACKGROUND ART

FIG. 6 illustrates a conventionally known steering device for an automobile. A steering wheel 1 is supported by and fastened to the rear-end section of a steering shaft 5, and this steering shaft 5 is passed in the axial direction through a cylindrical shaped steering column 6 and supported by the steering column 6 to as to rotate freely. The front-end section of the steering shaft 5 is connected to the rear-end section of an intermediate shaft 8 by way of a universal joint 7, and the front-end section of this intermediate shaft 8 is connected to an input shaft 3 by way of a different universal joint 9. When the operator operates the steering wheel 1, the rotation of this steering wheel 1 is transmitted to the input shaft 3 of a steering-gear unit 2 by way of the universal joint 7, the intermediate shaft 8 and the universal joint 9, and as this input shaft 3 rotates, a pair of left and right tie rods 4,4 are pushed and pulled, applying a steering angle to the front wheels.

An electric-powered power steering device is assembled in the steering device for an automobile illustrated in FIG. 6. An electric motor 10, which is the power source for applying an auxiliary force, is supported by a housing 11 that is fastened to the front-end section of the steering column 6. The output torque (auxiliary force) from the electric motor 10 is applied to the steering shaft 5 by way of a reducer or the like that is provided inside the housing 11.

A steering column device for an automobile in which a tilt mechanism for adjusting the up-down position of the steering wheel 1 and/or a telescopic mechanism for adjusting the forward-backward position of the steering wheel 1 according to the physique and driving posture of the operator are assembled is known and disclosed in JP2009227181 (A). In order to construct a tilt mechanism, the front-end section of a housing 11 is supported by the vehicle body 12 by way of a tilt shaft 13 that is arranged in the width direction (the width direction signifies the width direction of the vehicle body, and corresponds to the left-right direction) so as to be able to pivotally displace. A displacement bracket 14 is provided on the bottom surface of the middle section in the axial direction of the steering column 6, and a support bracket 15 is provided so as to sandwich the displacement bracket 14 from both sides in the width direction. The support bracket 15 includes an installation section 16 that is provided on the top section, and a pair of left and right support-plate sections 17 that hang downward from the installation-plate section 16, and the support bracket 15 is supported by the vehicle body by way of this installation-plate section 16.

Long tilt holes 18 that are circular arc shaped centered around the tilt shaft 13 and that extend in the up-down direction are formed in the pair of support-plate sections 17, and through holes 19 are formed in portions of the displacement bracket 14 that are aligned with part of the long tilt holes 18. The construction illustrated in FIG. 6 is construction in which a tilt and telescopic mechanism is assembled, making it possible to adjust the forward-backward position of the steering wheel 1 in addition to the up-down position, so the through holes 19 are long holes that extend in the axial direction of the steering shaft 5 and steering column 6, making it possible to expand or contract the steering shaft 5 and steering column 6.

FIG. 7 to FIG. 8 illustrate in more detail the construction of a tilt-type steering device in which a telescopic mechanism is assembled. The steering column 6 is constructed such that the front section of the outer column 20 that is located on the rear side and the rear section of the inner column 21 that is located on the front side fit together so that sliding movement is possible, and so that the overall length can be expanded or contracted. The outer column 20 is manufactured by die cast molding of a light alloy metal, for example, and by providing a slit 22 in the front section of the outer column 20, the inner diameter of the front section of this outer column 20 is able to elastically expand or contract. A pair of held plate sections 23 are provided in portions that are located on both sides in the width direction of the slit 22, and the displacement bracket 14 is formed by that pair of held plate sections 23. Through holes 19 that extend in the axial direction of the steering column 6 are formed in the pair of held plate sections 23. The pair of support-plate sections 17 of the support bracket 15 are located in portions that hold the displacement bracket 14 on both sides in the width direction, and long tilt holes 18 that have a partial arc shape centered around a tilt shaft 13 (see FIG. 6) and that extend in the up-down direction are formed in the pair of support-plate sections 17. A rod-shaped member 24 that is arranged in the width direction is inserted through the long tilt holes 18 and the through holes 19.

An adjustment lever 25 is provided on one end section in the axial direction of the rod-shaped member 24, an anchor section 26 is provided on the other end section in the axial direction of the rod-shaped member 24, and a cam device 27 is provided in a portion near the one end section of the middle section in the axial direction of the rod-shaped member 24. A tilt lock mechanism is constructed so that the space between the inside surfaces of the pair of support-plate sections 17 can be expanded or contracted by a tilting movement of the adjustment lever 25. The anchor section 26 has a shape like the head section of a bolt, and is such that a first engaging convex section 28 that is formed on the inside surface of the anchor section 26 engages with a long tilt holes 18 that is formed in the support-plate section 17 on the other end section side (support-plate section 17 on the right in FIG. 8) that faces the inside surface of the anchor section so that only displacement along this long tilt hole 18 is possible. The rod-shaped member 24 can be raised or lowered along the long tilt holes 18, however rotation of the rod-shaped member 24 around the center axis thereof is essentially suppressed.

A cam device 27 such as illustrated in FIG. 9 is assembled in the tilt-type steering device. The cam device 27 includes a drive-side cam 29 and a driven-side cam 30. The drive-side cam 29 is formed into an annular plate shape (the outer-circumferential surface is a cylindrical shape) having a center hole 30 through which the rod-shaped member 24 is inserted, and a drive-side cam surface 33 is formed on the inside surface in the width direction. The drive-side cam surface 33 includes a flat shaped drive-side basal surface 35, and drive-side convex sections 36 that are provided so as to protrude inward in the width direction from plural evenly spaced locations in the circumferential direction of the drive-side basal surface 35. The driven-side cam 30 is formed into an annular plate shape (the outer-circumferential surface is a cylindrical shape) having a center hole 32 through which the rod-shaped member 24 is inserted, a driven-side cam surface 34 is formed on the outside surface in the width direction that faces the drive-side cam surface 33 when cam device 27 is constructed, and a second engaging convex section 39 is formed on the inside surface in the width direction. The driven-side cam surface 34 includes a flat shaped driven-side basal surface 37, and driven-side convex sections 38 that are provided so as to protrude outward in the width direction from plural evenly spaced locations in the circumferential direction of the driven-side basal surface 37. In the example in FIG. 9, the outer diameter of the drive-side cam 29 and the outer diameter of the driven-side cam are the same as each other.

The driven-side cam 30 causes the second engaging convex section 39 to engage in the long tilt hole 18 that is formed in the support-plate section 17 on the one end section side (support-plate section 17 on the left in FIG. 8) of the pair of support-plate sections 17 that faces the inside surface in the width direction of the driven-side cam 30 so that only displacement along that long tilt hole 18 is possible. The driven-side cam 30 can raise or lower along this long tilt hole 18, however, does not rotate around its own axis. By connecting and fastening the base-end section of the adjustment lever 25 to the drive-side cam 29, the drive-side cam 29 rotates back-and-forth around the rod-shaped member 24 as the adjustment lever 25 is tilted back-and-forth. A thrust bearing 41 is provided between a nut 40 that is screwed onto one end section in the axial direction of the rod-shaped member 24 and the outside surface of the base-end section of the adjustment lever 25, which makes it possible for the drive-side cam 29 to rotate back-and-forth while at the same time supporting a thrust load that is applied to the drive-side cam 29. The nut 40 can be prevented from becoming loose by crimping or the like.

By tilting the adjustment lever 25 in a specified direction (generally downward) when adjusting the position of the steering wheel 1, the drive-side cam 29 is rotated in a direction that unlocks the cam device 27. As a result, as illustrated in FIG. 10C, by alternatingly arranging the drive-side convex sections 36 and the driven-side convex sections 38 in the circumferential direction, the dimension in the axial direction of the cam device 27 is in the contracted unlocked state, and the space between the driven-side cam 30, which corresponds to a pressure section, and the anchor section 26 expands. As a result, the surface pressure at the areas of contact between the inside surfaces of the pair of support-plate sections 17 and the outside surfaces of the pair of held-plate sections 23 decreases until it is lost, and at the same time, the inner diameter of the front-end section of the outer column 20 elastically expands, and the surface pressure at the area of contact between the inner-circumferential surface of the front-end section of the outer column 20 and the outer-circumferential surface of the rear-end section of the inner column 21 decreases. In this state, it becomes possible to adjust the up-down position and the forward-backward position of the steering wheel within the range that the rod-shaped member 24 is able to move inside the long tilt holes 18 and the through holes 19.

In order to maintain the steering wheel 1 at the desired position, the adjustment lever 25 is tilted in the opposite direction (generally upward) after the steering wheel 1 has been moved to the desired position. As a result, as illustrated in FIG. 10A, the tip-end surfaces of the drive-side convex sections 36 and the tip-end surfaces of the driven-side convex sections 38 are brought in contact with each other, the dimension in the axial direction of the cam device 27 is set to the expanded locked state, and the space between the inside surfaces of the pair of support-plate sections 17 contracts. In this state, the surface pressure at the areas of contact between the inside surfaces of the pair of support-plate sections 17 and the outside surfaces of the pair of held-plate sections 23 increases, and at the same time, the inner diameter of the front-end section of the outer column 20 elastically contracts, the surface pressure at the area of contact between the inner-circumferential surface of the front-end section of the output column 20 and the outer-circumferential surface of the rear-end section of the inner column 21 increases, and the steering wheel 1 is maintained at the adjusted position.

The tilting angle of the adjustment lever 25 when the steering wheel 1 is maintained in the desired position is determined by design according to the installation specifications for installing the tilt-type steering device into the vehicle body such as the inclination angle of the center axis of the steering column 6 with respect to the forward-backward direction, the shape of the column cover, and the relationship with other parts such as a combination switch that is located in a portion near the steering wheel 1, and is set so that there is no interference with the operation of the steering wheel 1 and the operation of the accelerator pedal and brake pedal. Adjustment of the tilting angle of the adjustment lever 25 is performed by selecting an appropriate width in the circumferential direction of the drive-side convex sections 36 and the driven-side convex sections 38 as the drive-side cam 29 and driven-side cam 30 of the cam device 27. The necessary force for holding the displacement bracket 14 with respect to the support bracket 15 differs depending on the diameter of the steering column 6, or in other words, the width dimension of the displacement bracket 14. When the force for holding the displacement bracket 14 with respect to the support bracket 15 differs, the amount of expansion or contraction of the space between the inside surfaces of the pair of support-plate sections 17 differs, so there are different cam devices 27 having various different amounts of expansion or contraction. Adjustment of the amount of expansion or contraction of the cam device 27 is performed by appropriately selecting the height in the axial direction of the drive-side convex sections 36 and driven-side convex sections 38 of the drive side cam 29 and driven-side cam 30. When it is desired to adjust the operational feeling of the adjustment lever 25, an appropriate angle between the inclination angle formed on the rear surface with respect to the unlocking direction of both side surfaces in the circumferential direction of the drive side convex sections 36, and the inclination angle that is formed on the front-side surface with respect to the unlocking direction of both side surfaces in the circumferential direction of the driven-side convex sections 38 is selected.

As described above, there are various kinds of drive-side cams 29 and driven side cams 30, for which the specifications of drive-side cam surface 33 and the driven-side cam surface 34, or in other words, the width in the circumferential direction and height in the axial direction of the driven-side convex sections 36 and the driven-side convex sections 38, and the inclination angle of the inclined surface differ.

In the factory for assembling the steering device, a worker selects and assembles an appropriate combination of a drive-side cam and a driven-side cam one at a time that correspond with each other according to the vehicle type from a case in which plural kinds of drive-side cams and driven-side cams are stored according to each kind. When doing this there is a possibility that one of the cams of the drive-side and driven-side cam will be mistakenly selected (taken mistakenly). In the case that the specifications for the cam surface between the proper cam (cam that was supposed to be selected) and the mistakenly selected cam differ only a little, it will be difficult to determine that there is a mistake (that there is a wrong combination) in the state before the cam device is assembled in the steering device. When it is determined after the steering device has been assembled that a cam was taken by mistake, it becomes necessary to perform the assembly work again from the beginning or part way, and productivity is impaired.

JP2000053001 (A) discloses construction in which by providing stopper protrusions at four locations that are evenly spaced in the circumferential direction of the outer-circumferential edge section of the cam surfaces of the cam members (drive-side cam and driven-side cam) that face each other, and regulating (limiting) the amount of relative rotation between a locking bolt and nut, it is possible to regulate the locked rotation position and unlocked rotation position. However, even in the case of the construction of the invention disclosed in JP2000053001, when one of the cams is taken by mistake, it becomes difficult to determine that the combination is wrong in the state before assembly.

RELATED LITERATURE

Patent Literature

[Patent Literature 1] JP2009227181 (A)
[Patent Literature 2] JP2000053001 (A)

SUMMARY OF INVENTION

Problems to be Solved by Invention

Taking into consideration the situation described above, the object of the present invention is to achieve construction of a cam device for which it is possible to easily determine whether or not the combination of the drive-side cam and driven-side cam is suitable.

Means for Solving Problems

The cam device of the present invention includes a drive-side cam and a driven-side cam.

The drive-side cam has a drive-side cam surface that is provided on one side surface in the axial direction, and that drive-side cam surface includes a flat shaped drive-side basal surface, and plural drive-side convex sections that are provided so as to protrude toward the one side in the axial direction from plural locations in the circumferential direction of the drive-side basal surface. In other words, the drive-side cam surface is an uneven surface in the circumferential direction.

The driven-side cam has a driven-side cam surface that is provided on the other side surface in the axial direction, and that driven-side cam surface includes a flat shaped driven-side basal surface, and plural (same number as the number of drive-side convex sections) driven-side convex sections that are provided so as to protrude toward the other side in the axial direction from plural locations in the circumferential direction of the driven-side basal surface. In other words, the driven-side cam surface is an uneven surface in the circumferential direction.

The cam device of the present invention is such that by causing the drive-side cam to rotate relative to the driven-side cam, the cam device is able to switch from a locked state in which the dimension in the axial direction is increased by the tip-end surfaces of the drive-side convex sections coming in contact with the tip-end surfaces of the driven-side convex sections, and an unlocked state in which the dimension in the axial direction is decreased by arranging the drive-side convex sections and the driven-side convex sections in an alternating manner in the circumferential direction. A drive-side marking is formed at one or plural locations in the circumferential direction of the outer-circumferential surface of the drive-side cam, and a driven-side marking is formed at one or plural locations of the outer-circumferential surface of the driven-side cam where the phase in the circumferential direction in the locked state coincides with the drive-side markings.

The drive-side cam is formed into an annular plate shape, for example, and is rotatably supported centered around a rod-shaped member, for example. The driven-side cam is formed into an annular plate shape, for example, and is supported by a mating member that faces in the axial direction toward the opposite side from the drive-side cam, and is prevented from rotating centered around the rod-shaped member.

Preferably, a second marking is formed in a portion of the outer circumferential surface of either one cam of the drive-side cam and the driven-side cam such that the phase thereof in the circumferential direction in the unlocked state coincides with the phase of the marking that is formed in the outer-circumferential surface of the other cam of the drive-side cam and the driven-side cam.

Preferably, the drive-side marking comprises a drive-side concave groove that is formed in the axial direction of the outer-circumferential surface of the drive-side cam, and the driven-side marking comprises a driven-side concave groove that is formed in the axial direction of the outer-circumferential surface of the driven-side cam. The drive-side concave groove can be formed using a press at the same time when the drive-side cam is made by performing plastic working using a press on metal material such as sintered metal, and the driven-side concave groove can be formed using a press at the same time when the driven-side came is made by performing plastic working using a press on metal material such as sintered metal. However, the drive-side marking and driven-side marking can also be any arbitrary marking that is visible from the outside such as concave sections or convex sections, marks made using paint or permanent marker, notches, or engravings, as long as the markings do not interfere with the function of the complete cam device.

Preferably, the drive-side cam further has a drive-side stopper section, and the driven-side cam further has a driven-side stopper section. The drive-side stopper section is provided so as to protrude toward the other side in the axial direction from one or plural locations in the circumferential direction of the outer-circumferential edge section of the one side surface in the axial direction of the drive-side cam. The driven-side stopper section is provided so as to protrude toward the one side in the axial direction from one or plural locations in the circumferential direction of the outer-circumferential edge section of the other side surface in the axial direction of the driven-side cam. The drive-side stopper section and driven-side stopper section form a stopper mechanism that, by one side surface in the circumferential direction of the driven-side stopper section coming in contact with the other side surface in the circumferential direction of the drive-side stopper section in the locked state, prevents the drive-side cam from further relative rotation with respect to the driven-side cam toward the other side in the circumferential direction. Either the drive-side marking or the driven-side marking is formed in the outer-circumferential surface of either the drive-side stopper section or the driven-side stopper section.

The position-adjusting device for a steering wheel of the present invention includes a steering column, a steering shaft, a displacement bracket, a support bracket, a pair of long tilt holes, a through hole, a rod-shaped member, an anchor section, a pressure section, and a cam device.

The steering column pivotally displaces centered around a tilt shaft that is arranged in the width direction.

The steering shaft is rotatably supported on the inside of the steering column, with the steering wheel being fastened to a portion thereof that protrudes from an opening on an end section of the steering column.

The displacement bracket is provided in the middle section in the axial direction of the steering column.

The support bracket has an installation-plate section that is provided on the top section, and a pair of support-plate sections that hang downward from that installation-plate section, the support bracket being supported by the vehicle body by way of the installation-plate section, with the displacement bracket being held on both sides in the width direction by the pair of support-plate sections.

The pair of long tilt holes are provided in portions of the pair of support-plate sections that are aligned with each other, and extend in the up-down direction, for example, in an arc shape that is centered around the tilt shaft, or in a straight shape that extends in the tangential direction to an arc that is centered around the tilt shaft.

The through hole is a circular hole or a long hole that extends in the axial direction of the steering column, and is formed in the width direction through a portion of the displacement bracket that is aligned with part of the pair of long tilt holes.

The rod-shaped member is inserted in the width direction through the pair of long through holes and the through hole.

The pressure section is provided on one end section of the rod-shaped member in a portion that protrudes from the outside surface of one support-plate section of the pair of support-plate sections.

The anchor section is provided on the other end section of the rod-shaped member in a portion that protrudes from the outside surface of the other support-plate section of the pair of support-plate sections.

The cam device expands or contracts the space between the anchor section and the pressure section.

The position-adjusting device for a steering wheel of the present invention uses the cam device of the present invention as the cam device. The driven-side cam of the cam device functions as the pressure section. That driven-side cam engages in the long tilt hole that is formed in the one support-plate section so as to be able to displace along that long tilt hole, while being prevented from rotating centered around the rod-shaped member. The drive-side cam of the cam device is rotatably supported by one end section of the rod-shaped member centered around the rod-shaped member while being prevented from displacing toward the one end side of the rod-shaped member. The drive-side cam could also fit around the outside of the rod-shaped member such that relative rotation is possible, or could also fit around the outside of the rod-shaped member rotatably in synchronization with the rod-shaped member.

The assembly method for assembling a steering wheel position-adjustment device is such that in order to assemble the steering wheel position-adjustment device of the present invention, the cam device is formed by combining together one drive-side cam and one driven-side cam that are selected from plural kinds each of drive-side cams and driven-side cams, after which that cam device is assembled around the rod-shaped member. The assembly method for assembling the position-adjusting device for a steering wheel of the present invention is such that the phases in the circumferential direction of the drive-side marking and the driven-side marking that coincide with each other in the locked state are made to differ for each type of drive-side cam and driven-side cam (for each combination of drive-side cam and driven-side cam that correspond to each other). One selected drive-side cam and one selected driven-side cam are combined in the locked state, and whether or not the phases in the circumferential direction of the drive-side marking and driven-side marking coincide with each other is visually checked in the state before the cam device is supported around the rod-shaped member. As a result, whether or not the combination of the one selected drive-side cam and the one selected driven-side cam is suitable (the combination corresponds to each other) is determined.

Effect of Invention

With the cam device of the present invention constructed as described above, it is possible to easily determine whether or not the combination of drive-side cam and driven-side cam is suitable. In other words, a drive-side marking is formed on the outer-circumferential surface of the drive-side cam, and a driven-side marking is formed in a portion of the outer-circumferential surface of the driven-side cam where the phase in the circumferential direction in the locked state correspond with the drive-side marking. Therefore, it is possible to easily determine whether or not the combination of drive-side cam and driven-side cam is suitable even in the state before the cam device is assembled around the rod-shaped member of the position-adjusting device for a steering wheel.

The assembly method for the position-adjusting device for a steering wheel of the present invention is such that when forming the cam device by combining together one drive-side cam and one driven-side cam that are selected from among plural kinds each of drive-side cams and driven-side cams, the phases in the circumferential direction of the drive-side marking and driven-side marking are made to differ for each type of drive-side cam and driven-side cam (for each combination of drive-side cam and driven-side cam the correspond to each other). Therefore, even in the case that one of the cams of the drive-side cam and driven-side cam is mistakenly used, when the tip-end surfaces of the drive-side convex sections and the tip-end surfaces of the driven-side convex sections come in contact with each other so that the drive-side cam and the driven-side cam are in the locked state, the phases in the circumferential direction of the drive-side marking and the driven-side marking do not coincide. As a result, it is possible to easily determine visually whether or not the combination of the drive-side cam and the driven-side cam is suitable, and thus it is possible to improve assembly.

BRIEF EXPLANATION OF DRAWINGS

FIG. 5 is a perspective view for explaining the effect of the present invention, and illustrates the case when there is a mistake in the combination of drive-side cam and driven-side cam.

MODES FOR CARRYING OUT INVENTION

Figure 6:
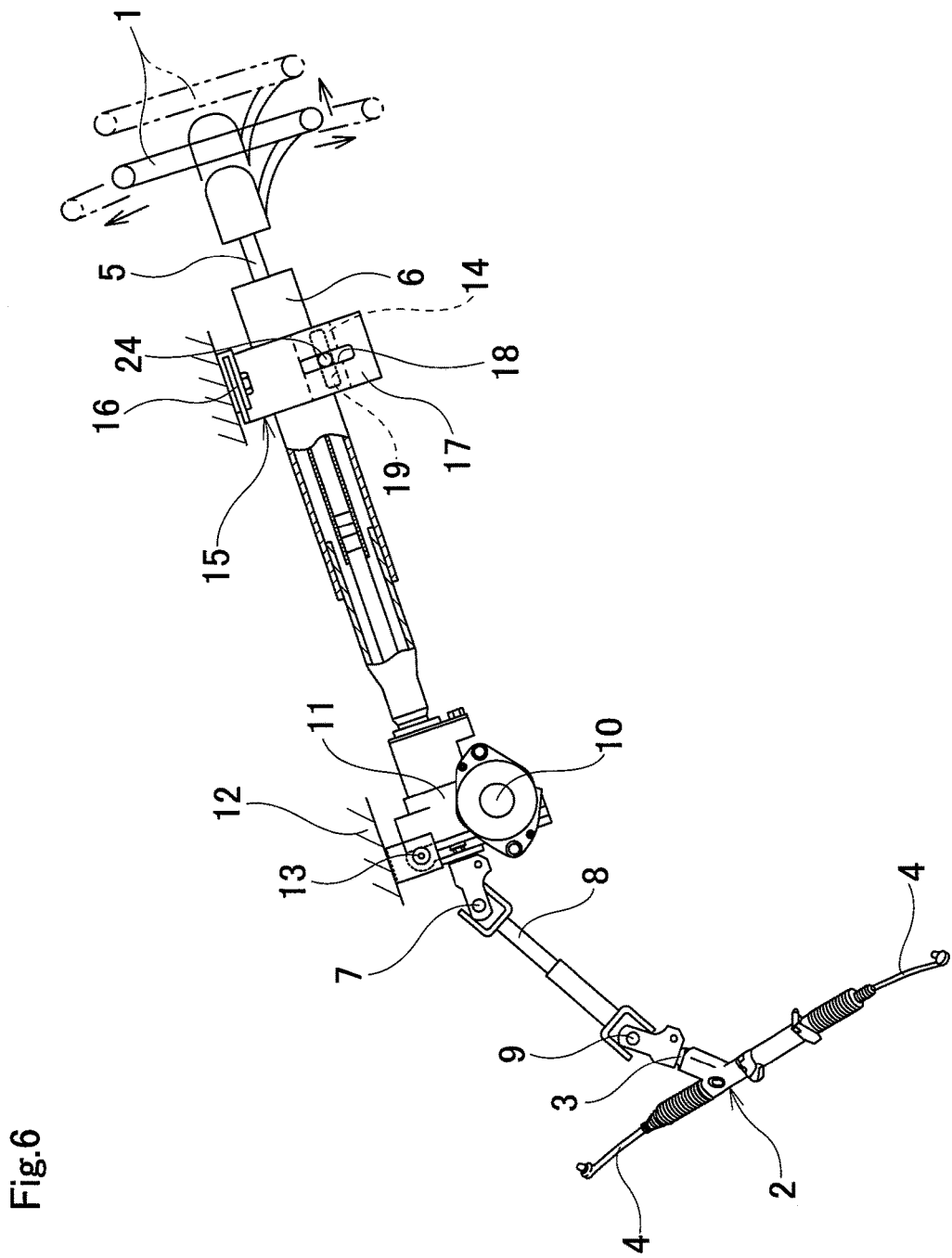
FIG. 6 is a partial side view illustrating an example of a steering device for an automobile in which the steering device of the present invention can be assembled.

FIG. 1 to FIG. 4 illustrate an example of an embodiment of the present invention. The steering device of this example is such that a tilt mechanism for adjusting the up-down position of a steering wheel 1 (see FIG. 6) is assembled, and includes a steering column 6a, a steering shaft 5a, a support bracket 15a, a displacement bracket 14a, a pair of long tilt holes 18a, a pair of through holes 19a, and a cam device 27a.

The steering column 6a is such that the front-end section is supported so as to be able to pivotally displace by way of a tilt shaft 13 (see FIG. 6) that is arranged in the width direction and fastened to the vehicle body 12. The steering shaft 5a is rotatably supported inside the steering column 6a, and the steering wheel 1 is fastened to the rear-end section of the steering shaft 5a.

The support bracket 15a is fastened to the vehicle body 12. The middle section of the steering column 6a is supported by the support bracket 15a so that adjustment of the up-down position is possible. The support bracket 15a is formed by bending a metal plate that has sufficient rigidity, and has an installation-plate section 16a that is provided on the top section, and a pair of support-plate sections 17a that are parallel with each other and hang downward from the installation-plate section 16a. A pair of long tilt holes 18a are formed in positions in the pair of support-plate sections 17a that are aligned with each other, and extend downward in a circular arc shape that is centered around the tilt shaft 13.

The displacement bracket 14a is provided by fastening a metal plate having sufficient rigidity and bent so as to have a U-shaped cross section to a portion in the middle section of the steering column 6a that is sandwiched between the pair of support-plate sections 17a by welding or the like. The displacement bracket 14a includes a pair of held-plate sections 23a that are parallel with each other and that overlap the pair of support-plate sections 17a in the width direction, and a pair of through holes 19a are concentrically formed in portions of the pair of held-plate sections 23a that are aligned with part of the long tilt holes 18a. A rod-shaped member 24a is inserted through the through holes 19a and the long tilt holes 18a.

The steering device of this example does not include a telescopic mechanism for adjusting the forward-backward position of the steering wheel 1, so the through holes 19a are simple round holes, however, in the case that there were a telescopic mechanism, the through holes would be constructed by long holes extending in the axial direction of the steering shaft 5a and the steering column 6a.

An adjustment lever 25a is provided on one end section (left-end section in FIG. 1) in the axial direction of the rod-shaped member 24a, an anchor section 26a is provided on the other end section (right-end section in FIG. 1) in the axial direction of the rod-shaped member 24a, and a cam device 27a is provided on a portion near the one end section in the axial direction of the rod-shaped member 24a. A tilt-lock mechanism is constructed so that a space between the inside surfaces of a pair of support-plate sections 17a expands or contracts based on tilting of the adjustment lever 25a.

A nut 40a is screwed onto the other end section in the axial direction of the rod-shaped member 24a. A thrust bearing 41a and a circular ring-shaped spacer 48 are located between the inside surface of the nut 40a and the outside surface of the other support-plate section 27a that faces the inside surface of the nut 40a so that the nut 40a is able to rotate relative the other support-plate section 27a. In this example, the nut 40a functions as the anchor section 26a. A balance spring 49, which is a tension spring, is provided between the spacer 48 and the support bracket 15a. The balance spring 49 supports the load of the portion that raises or lowers together with the steering column 6a, and is for lightening the burden on the operator when adjusting the up-down position of the steering wheel 1.

The cam device 27a includes a drive-side cam 29a and driven-side cam 30a. The drive-side cam 29a is made of a sintered metal, and is constructed so as to have an overall annular plate shape with a center hole 31a for inserting the rod-shaped member 24a through. A drive-side cam surface 33a, which is an uneven surface in the circumferential direction, is formed around the portion of the inner-diameter side (portion except the outer-circumferential edge section) of the inside surface (right-side surface in FIG. 1) of the drive-side cam 29a. The drive-side cam surface 33a has a flat surface shaped drive-side basal surface 35a and drive-side convex sections 36a having trapezoidal shaped cross-sections that protrude inward in the width direction from plural locations (four locations in the example in the figures) that are evenly spaced in the circumferential direction of the drive-side basal surface 35a. Drive-side stopper sections 42 that extend in the circumferential direction and protrude inward in the width direction are provided at plural locations (two locations on opposite sides in the radial direction in the example in the figures) in the circumferential direction of the outer-circumferential edge section of the inside surface of the drive-side cam 29a.

The drive-side cam 29a is connected and fastened to the base-end section of the adjustment lever 25a, and rotates back-and-forth as the adjustment lever 25a is tilted back and forth. The base-end section of the adjustment lever 25a engages with the one end section in the axial direction of the rod-shaped member 24a so that due to the fitting of uneven surfaces, relative rotation is impossible, and the drive-side cam 29a is able to rotate in synchronization with the rod-shaped member 24a. However, as in the case of the construction illustrated in FIG. 8, it is also possible to employ construction in which the drive-side cam is fitted so that rotation relative to the rod shaped member is possible.

The driven-side cam 30a is made using a sintered metal, has a center hole 32a for inserting the rod-shaped member 24a through, and has an overall annular shape. A driven-side cam surface 34a, which is an uneven surface in the circumferential direction, is formed around a portion of the inner-diameter side (portion except the outer-circumferential edge section) of the outside surface (left-side surface in FIG. 1) of the driven-side cam 30a. The driven-side cam surface 34a has a flat surface shaped driven-side basal surface 37a, and plural driven-side convex sections 38a that have a trapezoidal shape protruding outward in the width direction from plural locations that are evenly spaced in the circumferential direction of the driven-side basal surface 37a, with the number being the same as the number of drive-side convex sections 36a. Driven-side stopper sections 43 that protrude outward in the width direction and extend in the circumferential direction are provided at plural locations in the circumferential direction (two locations on opposite sides in the radial direction, in the example in the figure) of a portion of the outer-circumferential edge section of the outside surface of the driven-side cam 30a that is separated in the circumferential direction from the drive-side stopper sections 42 when combined with the drive-side cam 29a. The drive-side stopper sections 42 and the driven-side stopper sections 43 prevent more than necessary relative rotation between the drive-side cam 29a and the driven-side cam 30a, and form a stopper mechanism for regulating the positional relationship of the drive-side cam 29a and driven-side cam 30a (position in the circumferential direction of the drive-side cam 29a with respect to the driven-side cam 30a) in the locked state and unlocked state. In this example, the outer diameter of the drive-side cam 29a and the outer diameter of the driven-side cam 30 are nearly the same.

An engaging convex section 44 is provided on the inside surface of the driven-side cam 30a and protrudes toward the inside in the width direction. The outside surface in the forward-backward direction of the engaging convex section 44 has a shape that follows the inside surface in the forward-backward direction of the long tilt hole 18a that is formed in the one support-plate section 17a that faces the inside surface of the driven-side cam 30a.

The driven-side cam 30a fits around the outside of the rod-shaped member 24a so as to be able to rotate relative to the rod-shaped member 24a, and to displace in the axial direction relative to the rod-shaped member 24a. The engaging convex section 44 of the driven-side cam 30a engages with the long tilt hole 18a in the one support-plate section 17a so as to be able to displace only along the long tilt hole 18a. Therefore, the driven-side cam 30a is able to raise and lower along the long tilt hole 18a, however, except for rotating movement corresponding to the amount of space that exists between the inside surface in the forward-backward direction of the long tilt hole 18a in the one support-plate section 17a and the outside surface in the forward-backward direction of the engaging convex section 44, there is essentially no rotating movement centered around the center axis of the driven-side cam 30a.

Figure 1:
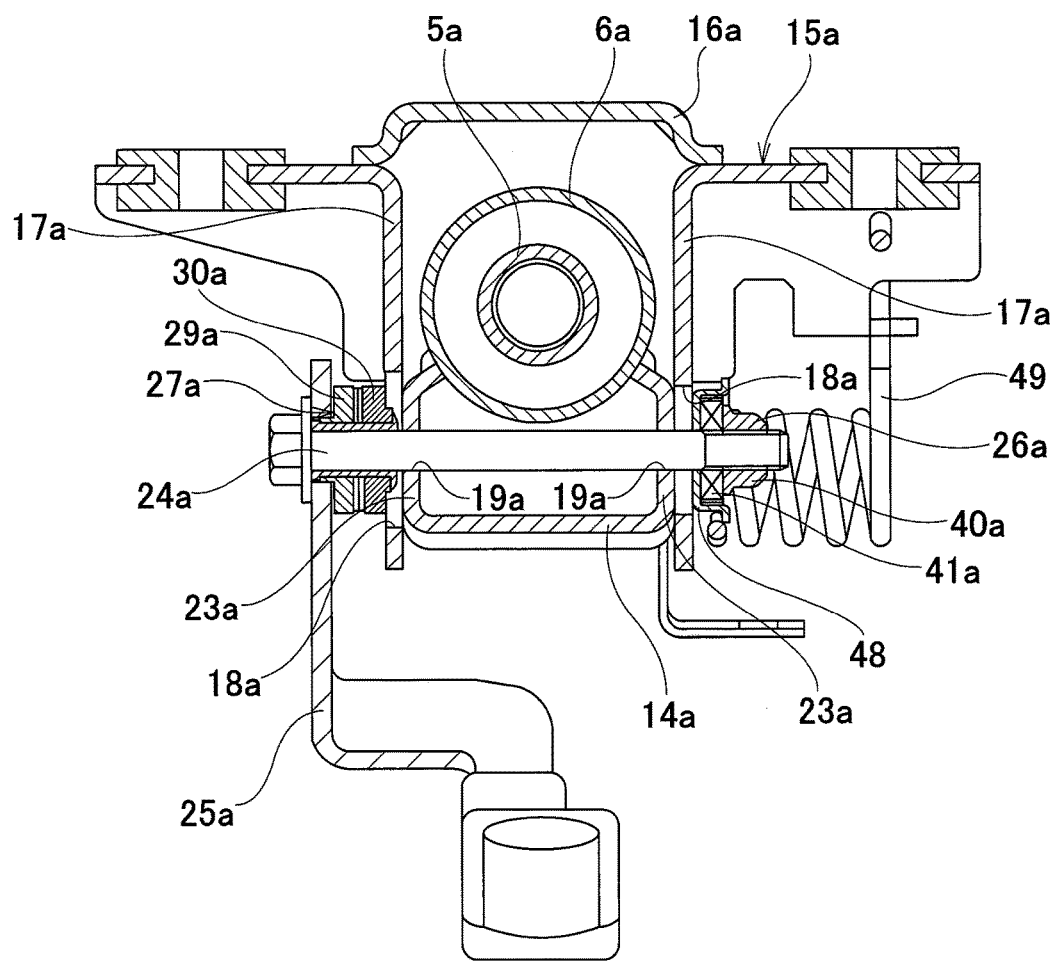
FIG. 1 is a cross-sectional view illustrating a steering device in which a cam device of an example of an embodiment of the present invention is assembled.
Figure 2:
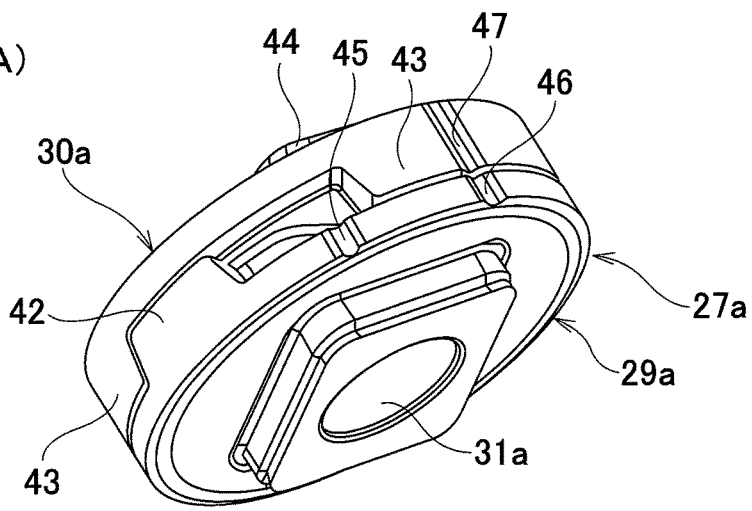
FIG. 2A is a perspective view of a removed cam device in the unlocked state.
FIG. 2B is a perspective view illustrating the state during switching between the unlocked state and locked state.
FIG. 2C is a perspective view illustrating the locked state.
Figure 2:
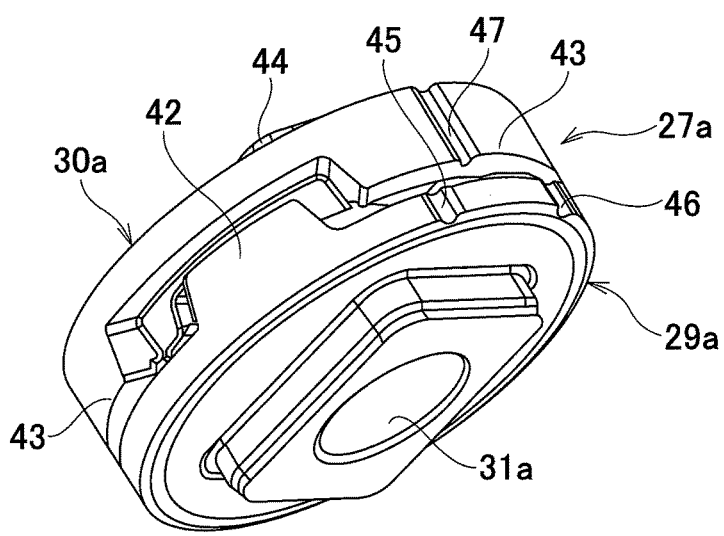
Figure 2:
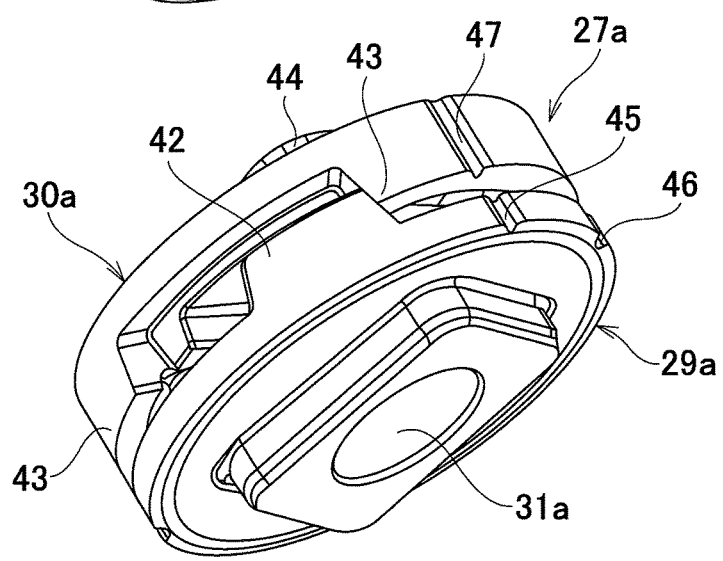
Figure 3A:
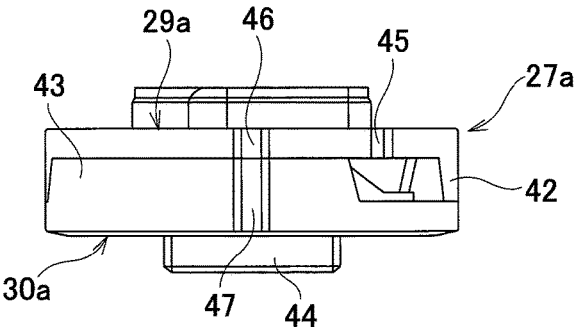
FIGS. 3A to 3D are side views illustrating the positional relationship at each point during switching from the unlocked state to locked state.
Figure 3B:
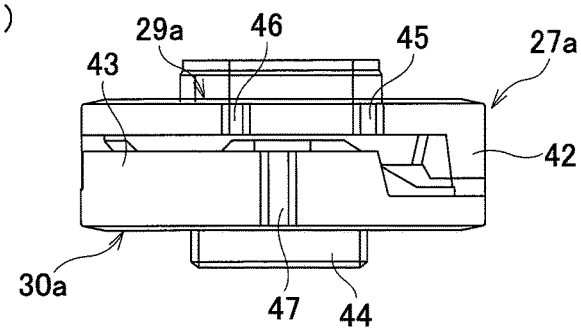

The steering device of the example described above is such that in order to set a state in which it is possible to adjust the up-down position of the steering wheel 1, the drive-side cam 29a is rotated in the unlocking direction by tilting the adjustment lever 25a in a specified direction (generally, downward). The drive-side convex sections 36a and driven-side convex sections 38a are arranged in an alternating manner in the circumferential direction, and the unlocked state is set by the one side surfaces in the circumferential direction of the drive-side stoppers sections 42 coming in contact with the other side surfaces in the circumferential direction of the driven-side stoppers 43. As illustrated in FIG. 2A and FIG. 3A, by arranging the drive-side convex sections 36a and the driven-side convex sections 38a in an alternating manner in the circumferential direction, the dimension in the axial direction of the cam device 27a is contracted, and the space between the driven-side cam 30a and the anchor section 26a (nut 40), which corresponds to the pressure section, expands. As a result, the surface pressure at the areas of contact between the inside surfaces of the pair of support-plate sections 17a and the outside surfaces of the pair of held-plate sections 23a decreases or is lost. In this state, the up-down position of the steering wheel 1 is adjusted within the range that the rod-shaped member 24a is able to move inside the long tilt hole 18a.

Figure 3C:
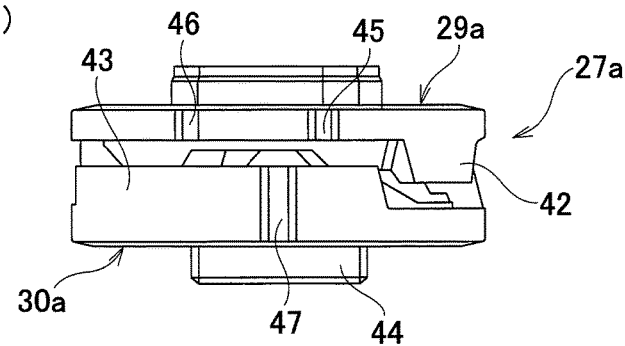
Figure 3D:
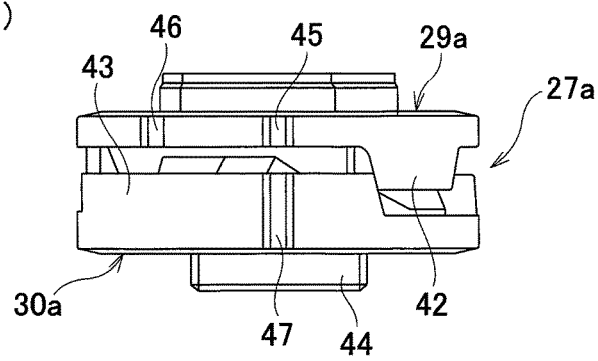
Figure 4A:
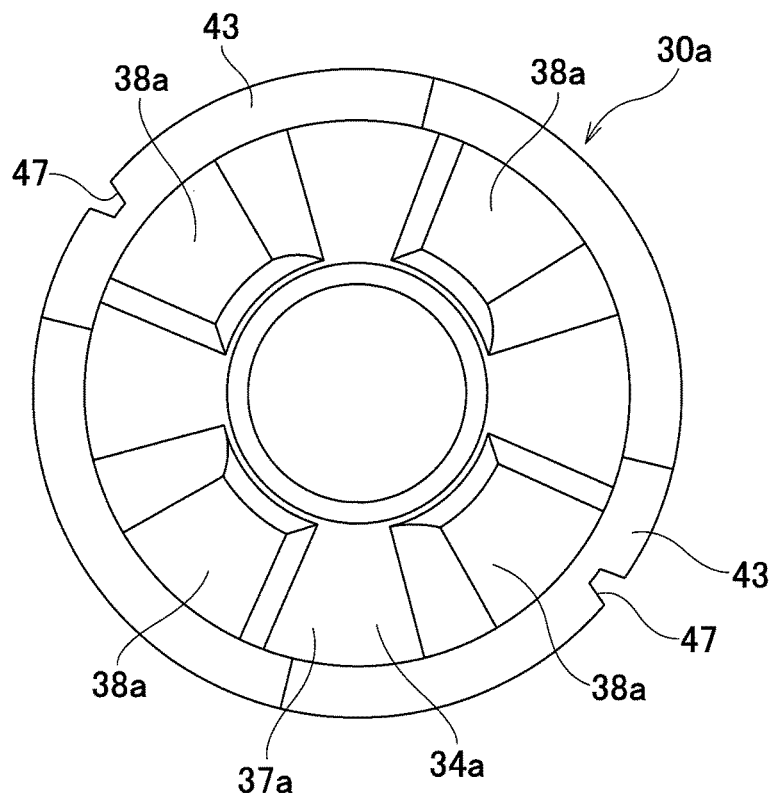
FIG. 4A is an end-surface view illustrating a removed drive-side cam.
Figure 4B:
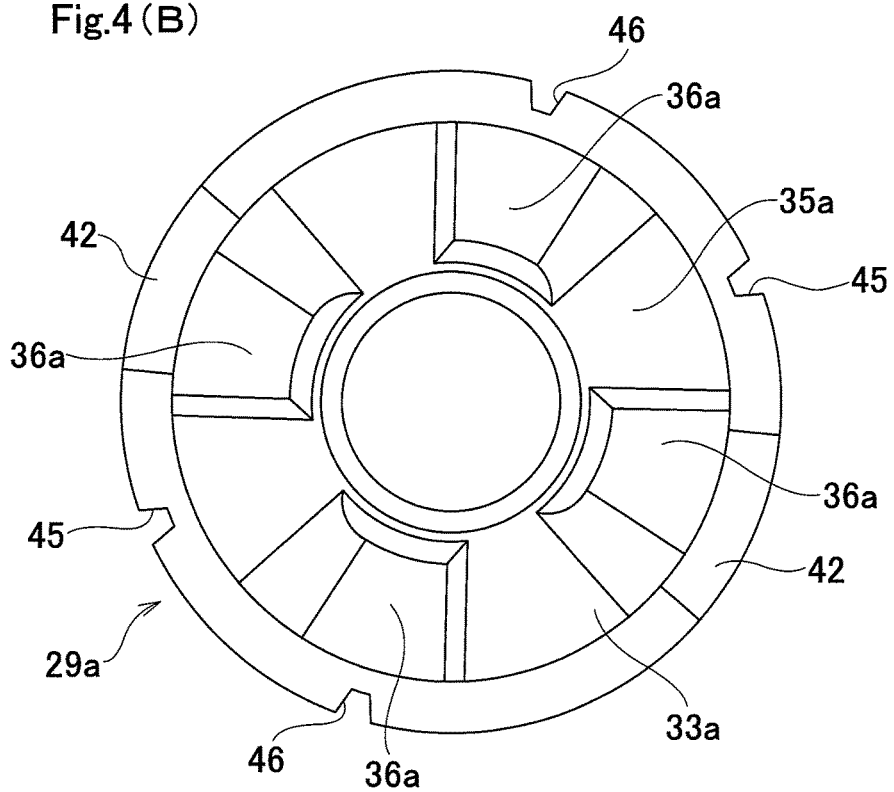
FIG. 4B is an end-surface view illustrating a removed driven-side cam.

On the other hand, in order to maintain the steering wheel 1 at the adjusted up-down position, the steering wheel 1 is moved to a desired height position, after which the adjustment lever 25a is tilted in the opposite direction (generally, upward). The locked state is then set by the tip-end surfaces of the drive-side convex sections 36a and the tip-end surfaces of the driven-side convex sections 38a coming in contact with each other, and the other side surfaces in the circumferential direction of the drive-side stopper sections 42 coming in contact with the one side surfaces in the circumferential direction of the driven-side stopper sections 43. As illustrated in FIG. 2C and FIG. 3C, by the tip-end surfaces of the drive-side convex sections 36a and the tip-end surfaces of the driven-side convex sections 38a coming in contact with each other, the dimension in the axial direction of the cam device 27a expands, and the space between the inside surfaces of the pair of support-plate sections 17a contracts. As a result, the surface pressure at the areas of contact between the inside surfaces of the pair of support-plate sections 17a and the outside surfaces of the pair of held-plate sections 23a increases, and the steering wheel 1 is maintained at the adjusted up-down position.

First drive-side concave grooves 45, which correspond to a drive-side marking, and second drive-side concave grooves 46, which correspond to a second marking, are provided in the outer-circumferential surface of the drive-side cam 29a, and driven-side concave grooves 47, which correspond to a driven-side marking, are provided in the outer-circumferential surface of the driven-side cam 30a. More specifically, the driven-side concave grooves 47 are formed in two locations of the outer circumferential surface of the driven-side cam 30a that are on opposite sides in the radial direction, and are formed in the outer-circumferential surfaces of the driven-side stopper sections 43 so as to be depressed inward in the radial direction and so as to extend in the axial direction. The first drive-side concave grooves 45 are formed in portions of the outer-circumferential surface of the drive-side cam 29a such that the phase thereof in the circumferential direction in the locked state coincides with that of the driven-side concave grooves 47, and are formed so as to be depressed inward in the radial direction and extend in the axial direction. The second drive-side concave grooves 46 are formed in portions of the outer-circumferential surface of the drive-side cam 29a such that the phase thereof in the circumferential direction in the unlocked state coincides with that of the driven-side concave grooves 47, and are formed so as to be depressed inward in the radial direction and extend in the axial direction. The first drive-side concave grooves 45 and the second drive-side concave grooves 46 are formed in portions in the outer-circumferential surface of the drive-side cam 29a such that the phase thereof in the circumferential direction is separated from that of the drive-side stopper sections 42. However, it is also possible to form the driven-side concave grooves in portions of the outer-circumferential surface of the driven-side cam such that the phase thereof in the circumferential direction is separated from that of the driven-side stopper sections, and to form the first drive-side concave grooves and second drive-side concave grooves in the outer-circumferential surfaces of the drive-side stopper sections of the outer-circumferential surface of the drive-side cam. Preferably, concave grooves that are to be formed in the outer-circumferential surface of either cam of the drive-side cam and driven-side cam for which there is a higher necessity to maintain strength, are formed in the outer-circumferential surface of the stopper sections that are formed in that cam. In any case, the first drive-side concave grooves, the second drive-side concave grooves and the driven-side concave grooves are formed in positions that can be easily checked even when the cam device is assembled in the steering device, and are formed in portions that do not affect the strength of the drive-side cam and driven-side cam even when the cam device is in the locked state and the dimension in the axial direction is increased.

The phases in the circumferential direction of the first drive-side concave grooves 45, the second drive-side concave grooves 46, and the driven-side concave grooves 47 differ for each type of drive-side cam 29a and driven-side cam 29a.

The first drive-side concave grooves 45, the second drive-side concave grooves 46, and the driven-side concave grooves 47 are formed at the same time that the drive-side cam 29 and driven-side cam 30 are made by performing plastic working with a press of a annular sintered metal blank. The drive-side cam 29a (driven-side cam 30a) is made by pressing a blank into a metal die that has a inner-surface shape that follows the outer-surface shape of the drive-side cam 29a (driven-side cam 30a) (has a back-end surface shape that follows the drive-side cam surface 33a (driven-side cam surface 34a). In this example, protrusions that extend in the axial direction are formed in portions of the inner-circumferential surface of the metal die that correspond to the first drive-side concave grooves 45 and second drive-side concave grooves 47 (driven-side concave grooves 47). As the blank is pressed into the metal die, the protrusions form the first drive-side concave grooves 45 and second drive-side concave grooves 46 (driven-side concave grooves 47) in the outer-circumferential surface of the drive-side cam 29a (driven-side cam 30a).

The cross-sectional dimension and size of the first drive-side concave grooves 45, the second drive-side concave grooves 46, and the driven-side concave groves 47 are not particularly limited. The shape of the grooves is not limited to a trapezoidal shape such as illustrated in the figures, and it is possible to apply various shapes such as a V shape, rectangular shape, a U shape, a semi-circular shape and the like. In the example in the figures, the first drive-side concave grooves 45, the second drive-side concave grooves 46, and the driven-side concave groves 47 are formed in the outer-circumferential surface of the drive-side cam 29a and driven-side cam 30a so as to extend completely in the axial direction, however, they could also be formed so as to extend only part way in the axial direction.

With the steering device of this example as described above, it is possible to prevent assembling the cam device 27a with a wrong combination as a result of mistakenly using a wrong cam for either the drive-side cam 29 or driven-side cam 30a, and thus it is possible to improve assembly. In other words, the first drive-side concave grooves 45 and second drive-side concave grooves 46 are formed in the outer-circumferential surface of the drive-side cam 29a, the driven-side concave grooves 47 are formed in the outer-circumferential surface of the driven-side cam 30a. Therefore, even in the state before assembling the cam device 27a in the steering device, the combination of drive-side cam 29a and driven-side cam 30a can be easily determined to be suitable (combination corresponds to each other) or not suitable. At the assembly plant of the steering device, the workers select and assemble a drive-side cam 29a and a driven-side cam 30a one at a time from a case that stores plural types of each kind of drive-side cam 29a and driven-side cam 30a according to vehicle type. Therefore, the phase in the circumferential direction of the first drive-side concave grooves 45, the second drive-side concave grooves 46, and the driven-side concave grooves 47 differ for each type of drive-side cam 29a and driven-side cam 30a (for each combination that corresponds to each other). As a result, when a wrong cam is mistakenly taken for either the drive-side cam 29a or driven-side cam 30a, and the drive-side cam 29a and driven-side cam 30a are combined so as to be set in a locked state or an unlocked state, the phases in the circumferential direction of the first drive-side concave grooves 45 or second drive-side concave grooves 46 and the driven-side concave grooves 47 do not coincide with each other such as illustrated in FIG. 5, for example. As a result, it becomes easy to determine visually whether or not the combination of the drive-side cam 29a and the driven-side cam 30a is suitable.

When assembling the steering device of this example, the rod-shaped member 24a is inserted through the center hole 31a in the drive-side cam 29a and the center hole 32a in the driven-side cam 30a with the drive-side cam 29a and the driven-side cam 30a combined so as to be in the locked state, and furthermore, the other half section in the axial direction of this rod-shaped member 24a is inserted through the through holes 19a and the long tilt holes 18a. A thrust bearing 41a and a spacer 48 are arranged (placed over) on the other end section in the axial direction of the rod-shaped member 24, and a nut 40a is screwed on to that other end section. In this example, the first drive-side concave grooves 45 and second drive-side grooves 46 are formed on the outer-circumferential surface of the drive-side cam 29a, and the driven-side concave grooves 47 are formed on the driven-side cam 30a, so even immediately after the cam device 27a has been assembled in the steering device, it is possible to easily determine whether or not the combination of drive-side cam 29a and driven-side cam 30a is suitable by visually checking whether or not the phases in the circumferential direction of the first drive-side concave grooves 45 and driven-side concave grooves 47 coincide with each other.

When assembling the steering device, the holding force of the displacement bracket 14a with respect to the support bracket 15a is adjusted by adjusting the tightening force of the nut 40a with the cam device 27a switched to the locked state as is.

The first drive-side concave grooves 45, the second drive-side concave grooves 46, and the driven-side concave grooves 47 are formed at the same time that the drive-side cam 29a and driven-side cam 30a are made by performing plastic working using a press on a sintered metal blank having an annular plate shape, so it is possible to suppress an increase in the manufacturing cost accompanied with providing the first drive-side concave grooves 45, the second drive-side concave grooves 46, and the driven-side concave grooves 47. However, it is also possible to form the drive-side concave grooves 45, the second drive-side concave grooves 46, and the driven-side concave grooves 47 in a process separate from the plastic working with a press; for example, a cutting process.

Figure 7:
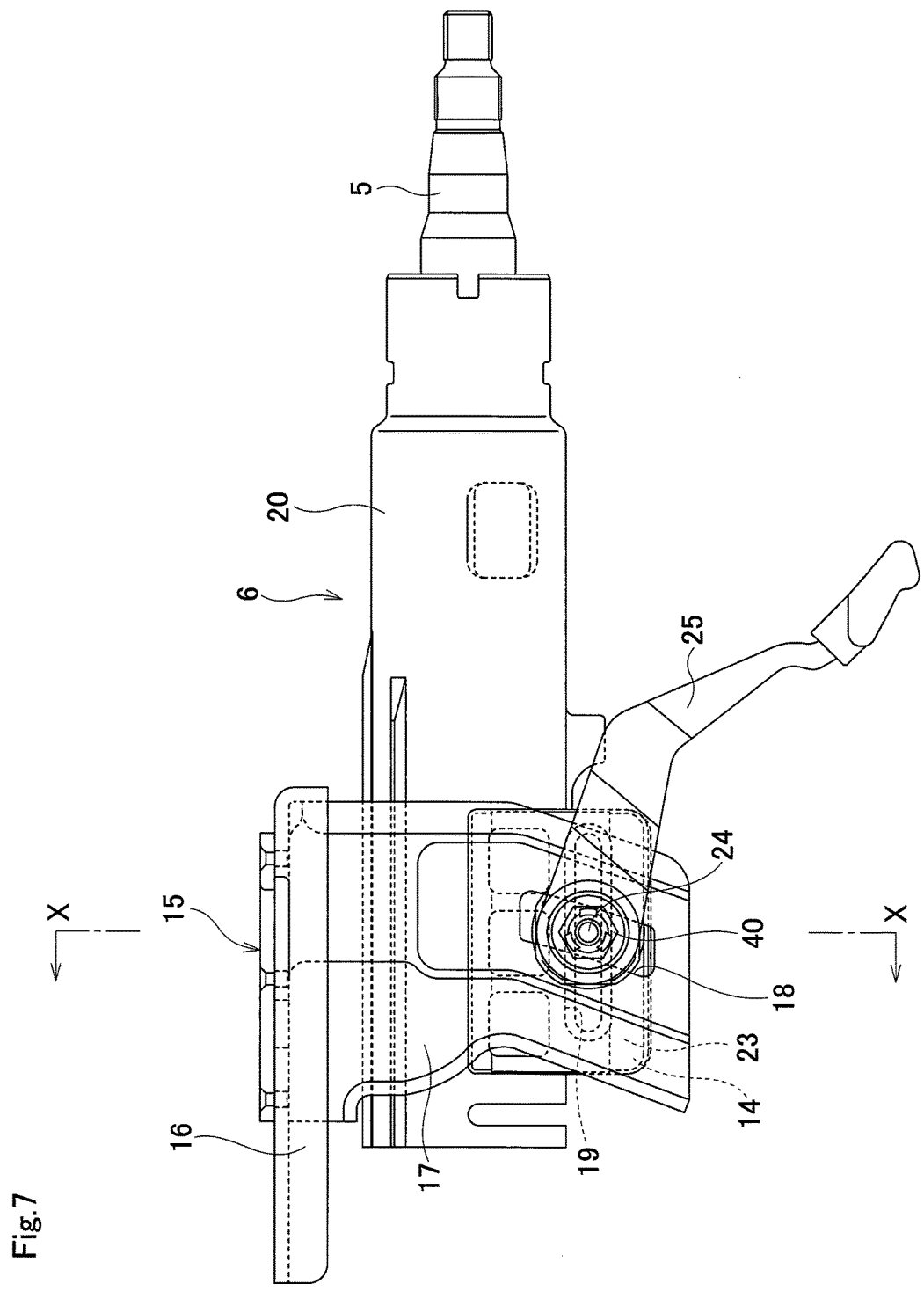
FIG. 7 is a partial side view illustrating more detailed construction of a steering device.
Figure 8:
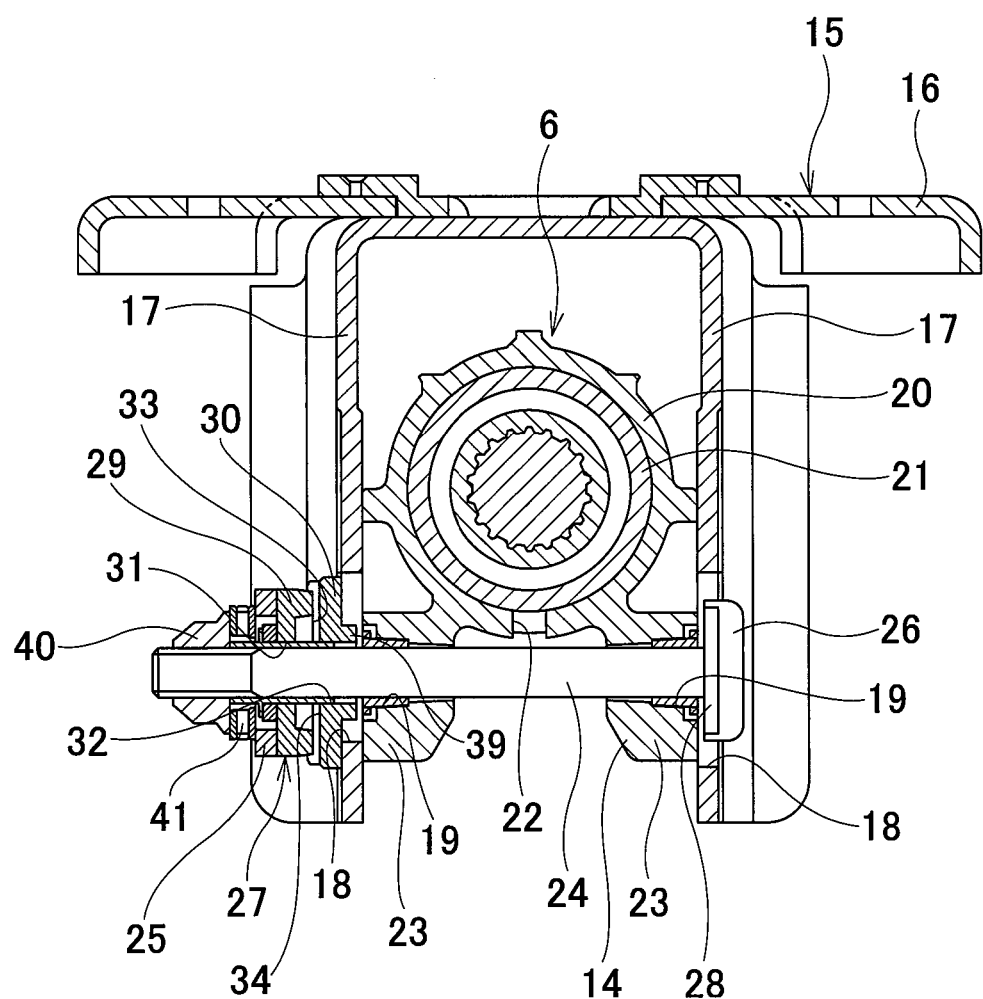
FIG. 8 is a cross-sectional view of section X-X in FIG. 7.
Figure 9:
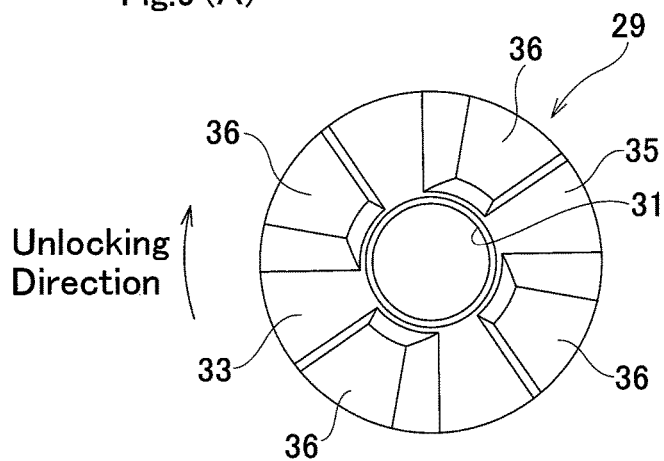
FIG. 9A is a schematic view as seen from the front of a drive-side cam of a conventional cam device.
FIG. 9B is a schematic view as seen from the front of a driven-side cam.
FIG. 9C is a schematic view as seen from the rear of a driven-side cam.
Figure 9:
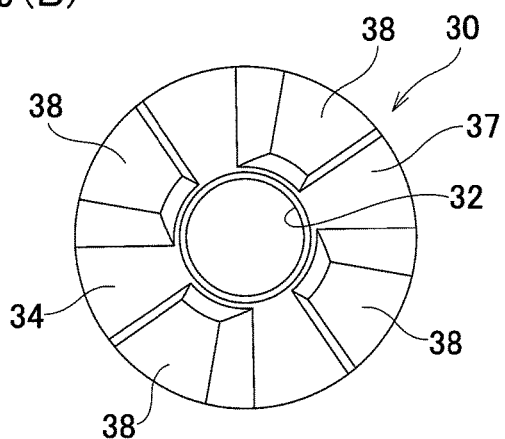
Figure 9:
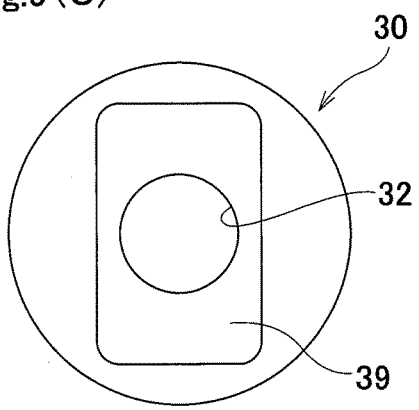
Figure 10:
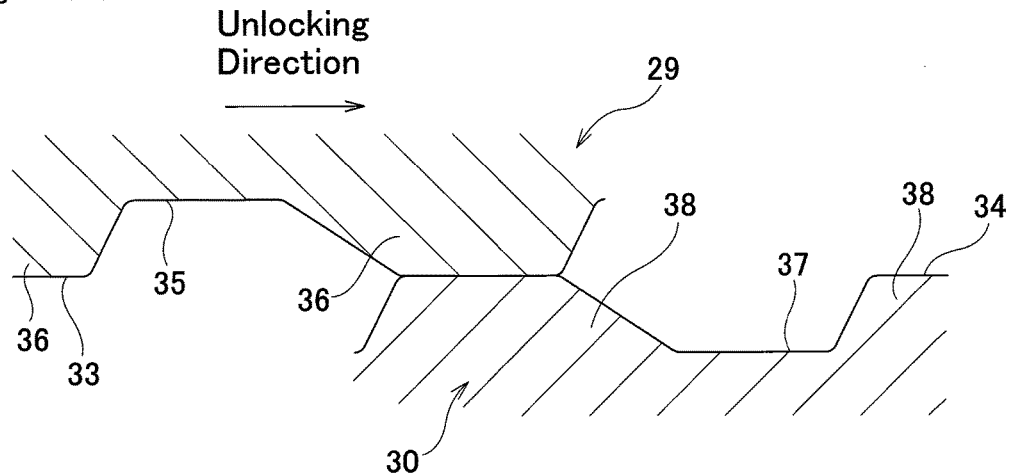
FIG. 10 is a cross-sectional schematic view for explaining the change in the contact state between cam surfaces when switching a conventional cam device from the locked state to the unlocked state.
Figure 10:
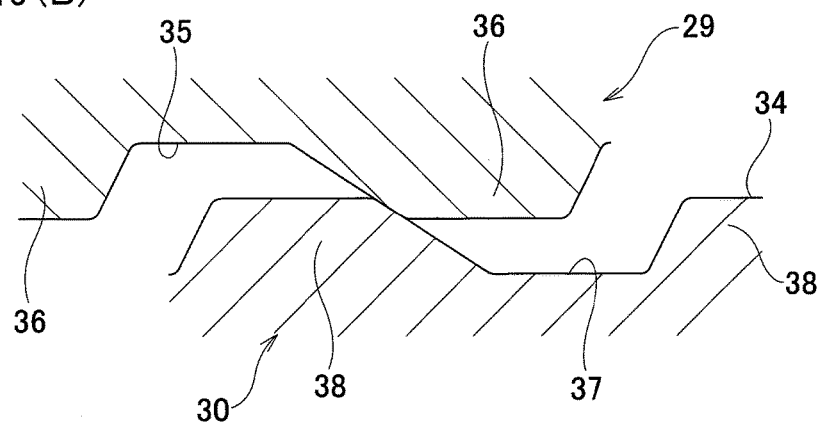
Figure 10:
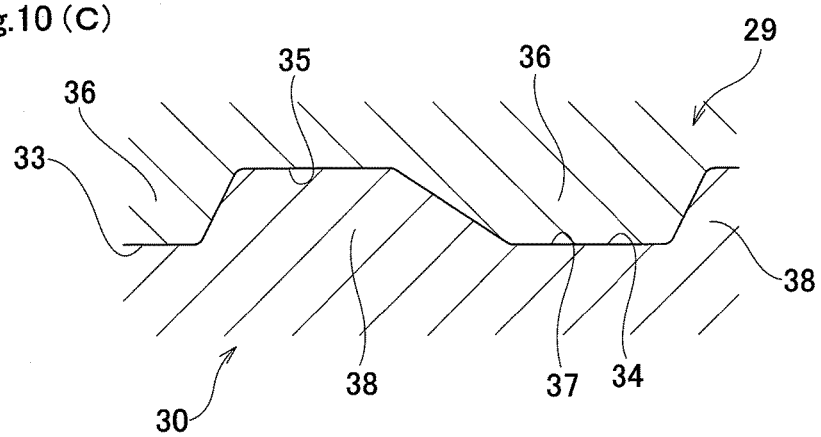

The steering device of this example includes only a tilt adjustment mechanism that is capable of adjusting the up-down position of a steering wheel 1, however, as illustrated in FIG. 7 and FIG. 8, the present invention can also be embodied in construction that includes both a tilt adjustment mechanism and a telescopic adjustment mechanism.

EXPLANATION OF REFERENCE NUMBERS

1 Steering wheel
2 Steering-gear unit
3 Input shaft
4 Tie rod
5, 5a Steering shaft
6, 6a Steering column
7 Universal joint
8 Intermediate shaft
9 Universal joint
10 Electric motor
11 Housing
12 Vehicle body
13 Tilt shaft
14, 14a Displacement bracket
15, 15a Support bracket
16, 16a Installation-plate section
17, 17a Support-plate section
18, 18a Long tilt hole
19, 19a Through hole
20 Outer column
21 Inner column
22 Slit
23, 23a Held-plate section
24, 24a Rod-shaped member
25, 25a Adjustment lever
26, 26a Anchor section
27, 27a Cam device
28 First engaging convex section
29, 29a Drive-side cam
30, 30a Driven-side cam
31, 31a Center hole
32, 32a Center hole
33, 33a Drive-side cam surface
34, 34a Driven-side cam surface
35, 35a Drive-side basal surface
36, 36a Drive-side convex section
37, 37a Driven-side basal surface
38, 38a Driven-side convex section
39 Second engaging convex section
40 Nut
41 Thrust bearing
42 Drive-side stopper section
43 Driven-side stopper section
44 Engaging convex section
45 First drive-side concave groove
46 Second drive-side concave groove
47 Driven-side concave groove
48 Spacer
49 Balance spring

What is claimed is:

1. A cam device comprising:
a drive-side cam; and
a driven-side cam;
the drive-side cam having a drive-side cam surface provided on one side surface in an axial direction of the cam device, and the drive-side cam surface comprising a flat shaped drive-side basal surface, and plural drive-side convex sections provided to protrude toward one side in the axial direction from plural locations in a circumferential direction of the drive-side basal surface;
the driven-side cam having a driven-side cam surface provided on an other side surface in the axial direction of the cam device, and the driven-side cam surface comprising a flat shaped driven-side basal surface, and plural driven-side convex sections provided to protrude toward an other side in the axial direction from plural locations in a circumferential direction of the driven-side basal surface;
the cam device being switchable between a locked state in which a dimension in the axial direction is increased by tip-end surfaces of the drive-side convex sections coming in contact with tip-end surfaces of the driven-side convex sections, and an unlocked state in which the dimension in the axial direction is decreased by arranging the drive-side convex sections and the driven-side convex sections in an alternating manner in a circumferential direction of the cam device, by relatively rotating the drive-side cam and the driven side cam; and
the drive-side cam having a drive-side marking formed at one or plural locations in a circumferential direction of an outer-circumferential surface of the drive-side cam, and the driven-side cam having a driven-side marking formed in portions of an outer-circumferential surface of the driven-side cam such that a phase of the driven-side marking in a circumferential direction of the driven-side cam coincides with a phase of the drive-side marking in a circumferential direction of the drive-side cam in the locked state of the cam device.

2. The cam device according to claim 1, wherein
a second marking is formed in a portion of the outer circumferential surface of either one of the drive-side cam and the driven-side cam such that a phase of the second marking in the circumferential direction coincides with the phase of either of the drive-side marking or the driven-side marking in an outer-circumferential surface of the other of the drive-side cam and the driven-side cam.

3. The cam device according to claim 1, wherein
the drive-side marking comprises a drive-side concave groove formed in an axial direction of the outer-circumferential surface of the drive-side cam; and
the driven-side marking comprises a driven-side concave groove formed in an axial direction of the outer-circumferential surface of the driven-side cam.

4. The cam device according to claim 1, wherein
the drive-side cam further has a drive-side stopper section, with the drive-side stopper section being provided to protrude toward the other side in the axial direction from one or plural locations in a circumferential direction of an outer-circumferential edge section of the one side surface in an axial direction of the drive-side cam, the drive-side stopper section having one side surface and an other side surface in a circumferential direction;

the driven-side cam further has a driven-side stopper section, with the driven-side stopper section being provided to protrude toward the one side in the axial direction from one or plural locations in a circumferential direction of an outer-circumferential edge section of the other side surface in an axial direction of the driven-side cam, the driven-side stopper section having one side surface and an other side surface in a circumferential direction;

the drive-side stopper section and the driven-side stopper section form a stopper mechanism that, by the one side surface in a circumferential direction of the driven-side stopper section coming in contact with the other side surface in a circumferential direction of the drive-side stopper section in the locked state, prevents the drive-side cam from further relative rotation with respect to the driven-side cam toward the other side in the circumferential direction of the cam device; and either the drive-side marking or the driven-side marking is formed in the outer-circumferential surface of either the drive-side stopper section or the driven-side stopper section.

5. A position-adjusting device for a steering wheel, comprising:

a steering column pivotally displacing centered around a tilt shaft that is arranged in a width direction of the position-adjusting device;

a steering shaft rotatably supported on an inside of the steering column, with the steering wheel being fastened to a portion thereof that protrudes from an opening on an end section of the steering column;

a displacement bracket provided in a middle section in an axial direction of the steering column;

a support bracket having an installation-plate section that is provided on a top section, and a pair of support-plate sections that hang downward from the installation-plate section, the support bracket being supported by a vehicle body by way of the installation-plate section, with the displacement bracket being held on both sides in the width direction by the pair of support-plate sections;

a pair of long tilt holes provided in portions of the pair of support-plate sections that are aligned with each other, and the pair of long tilt holes extending in an up-down direction;

a through hole formed in the width direction through a portion of the displacement bracket that is aligned with part of the pair of long tilt holes;

a rod-shaped member inserted in the width direction through the pair of long through holes and the through hole;

a pressure section provided on one end section of the rod-shaped member in a portion that protrudes from an outside surface of one support-plate section of the pair of support-plate sections;

an anchor section provided on an other end section of the rod-shaped member in a portion that protrudes from an outside surface of an other support-plate section of the pair of support-plate sections; and the cam device according to claim 1 for expanding or contracting a space between the anchor section and the pressure section; wherein the driven-side cam of the cam device functions as the pressure section, and the driven-side cam engages in the long tilt hole that is formed in the one support-plate section so as to be able to displace along the long tilt hole, while being prevented from rotating centered around the rod-shaped member, and the drive-side cam of the cam device is supported by the one end section of the rod-shaped member so as to be able to rotate centered around the rod-shaped member while being prevented from displacing toward the one end side of the rod-shaped member.

6. A method for assembling the position-adjusting device for the steering wheel according to claim 5, the method comprising steps of: providing a plurality of drive-side cams and driven-side cams: selecting one drive-side cam of the plurality of drive-side cams and one driven-side cam of the plurality of driven-side cams: forming the cam device by combining together the one drive-side cam and the one driven-side cam; visually checking to ensure that the phases in the circumferential direction of the drive-side marking and driven-side marking coincide with each other in the locked state; and assembling the cam device around the rod-shaped member; wherein each of the plurality of types of drive-side cams and driven-side cams have phases in the circumferential direction of the drive-side marking and the driven-side marking that coincide with each other in the locked state, the phases differing among the plurality of types of drive-side cams and driven-side cams.

* * * * *